(12) United States Patent
Lesner et al.

(10) Patent No.: US 11,922,420 B2
(45) Date of Patent: *Mar. 5, 2024

(54) SYSTEM AND METHOD FOR ERROR CORRECTING CODING OF BILLING TRANSACTIONS FOR DATA MANAGEMENT SYSTEM USER IDENTITY VERIFICATION

(71) Applicant: Intuit Inc., Mountain View, CA (US)

(72) Inventors: Christopher Lesner, Palo Alto, CA (US); Alexander S. Ran, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 17/509,874

(22) Filed: Oct. 25, 2021

(65) Prior Publication Data

US 2022/0044249 A1    Feb. 10, 2022

Related U.S. Application Data

(63) Continuation of application No. 16/452,975, filed on Jun. 26, 2019, now Pat. No. 11,244,320.

(51) Int. Cl.
*G06Q 20/40* (2012.01)
*G06F 11/10* (2006.01)
*G06F 21/62* (2013.01)

(52) U.S. Cl.
CPC ......... *G06Q 20/4016* (2013.01); *G06F 11/10* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 10,015,324 B2* | 7/2018 | Gopalakrishnan | G06Q 30/06 |
| 10,812,460 B2* | 10/2020 | Kurian | G06F 21/31 |
| 2003/0154406 A1* | 8/2003 | Honarvar | G07C 9/37 |
| | | | 713/153 |
| 2007/0092103 A1* | 4/2007 | Mihcak | H04N 21/8358 |
| | | | 380/201 |

(Continued)

*Primary Examiner* — Jamie R Kucab
(74) *Attorney, Agent, or Firm* — Paradice & Li LLP

(57) ABSTRACT

Systems and methods for authenticating a user are disclosed. An example method may be performed by one or more processors of a system and include generating an encoded identification tag including identification information associated with a user's account, embedding the encoded identification tag in a transaction description associated with a payment from the user, receiving a request to access the user's account, retrieving an existing identification tag from the transaction description, generating a decoded identification tag from the existing identification tag, determining whether information retrieved from the decoded identification tag matches the identification information, and granting the request to access the user's account if at least a portion of the information retrieved from the decoded identification tag matches the identification information or denying the request to access the user's account if the information retrieved from the decoded identification tag does not match at least a portion of the identification information.

20 Claims, 7 Drawing Sheets

400

402

| |
|---|
| Target00018159 prchs |
| Groupon Inc xxx0000 |
| Costcowhse #9308xv |
| Paypal here jane doe |
| Facebk 0kgzvfw fb.me/ads |
| Web auth paymnt usbank.com 000-00nvk |
| Starbucks store 0000northridge_00gl10 |
| Ub checking transfer 8389239_tripfruit |
| Dvla-ro00mrx |
| Data mgnt sys K39VL00XO3AF3 |

| |
|---|
| DATA MANAGEMENT SYSTEM PAYMENT DK39VL2CDO3AF3 |

404

(56) References Cited

U.S. PATENT DOCUMENTS

| | | | | |
|---|---|---|---|---|
| 2008/0115198 A1* | 5/2008 | Hsu | ............... | G06F 21/31 |
| | | | | 713/182 |
| 2009/0178120 A1* | 7/2009 | Royyuru | ............ | G06F 21/31 |
| | | | | 726/4 |
| 2011/0041170 A1* | 2/2011 | Wankmueller | ......... | H04L 63/12 |
| | | | | 715/764 |

* cited by examiner

SYSTEM AND METHOD FOR ERROR CORRECTING CODING OF BILLING TRANSACTIONS FOR DATA MANAGEMENT SYSTEM USER IDENTITY VERIFICATION

CROSS-REFERENCE TO RELATED APPLICATION

This Patent Application is a continuation of, and claims priority to, U.S. patent application Ser. No. 16/452,975 entitled "SYSTEM AND METHOD FOR ERROR CORRECTING CODING OF BILLING TRANSACTIONS FOR DATA MANAGEMENT SYSTEM USER IDENTITY VERIFICATION" and filed on Jun. 26, 2019, which is assigned to the assignee hereof. The disclosures of all prior Applications are considered part of and are incorporated by reference in this Patent Application.

TECHNICAL FIELD

This disclosure relates generally to identity verification, and specifically to error correction encoding of a transaction description for user identity verification.

BACKGROUND

Due to the complexity of government tax codes, millions of taxpayers find it necessary to obtain help in preparing and filing their tax returns. Electronic tax return preparation systems have become popular tools for helping taxpayers in this task. This is because electronic tax return preparation systems can provide a flexible, highly accessible, and affordable source of tax preparation assistance. However, as more people turn to electronic tax return preparation systems, there is increased motivation and opportunity for fraudsters to try to use tax return preparation systems to illicitly file false tax returns and fraudulently obtain tax refunds.

To achieve their goals, fraudsters often seek to steal personally identifying information such as names, addresses, phone numbers, email addresses, birth dates, Social Security numbers and other personally identifying information from unaware victims. Once the personally identifying information is obtained, the fraudsters then attempt to file false tax returns and obtain fraudulent tax refunds using the personally identifying information. If fraudsters are successful, when a victim of this identity theft tries to file his or her own tax return they may discover, to their significant dismay, that the fraudster has used the victim's personal information to file a false tax return in the name of the victim and has already collected the victims tax refund. Clearly this is a very stressful situation for the victim who is then forced to fight an expensive and time-consuming battle to clear up the mess in order to file his or her legitimate tax return. Additionally, if the fraudsters are successful, the federal government and state governments are defrauded of the tax refund money that was illegally obtained by the fraudster. This, in turn, makes all taxpayers victims of these fraudsters.

One method fraudsters use is to exploit account recovery procedures to illicitly gain access to user accounts. When a legitimate user forgets a username or password to their accounts with data management systems, the user can attempt to recover access to the account by satisfying a variety of security procedures. These security procedures often include one or more of providing answers to secret security questions of the user, providing a social security number of the user, clicking an account recovery link sent in an email to the user, entering a code that was sent to the user in a text message, or providing a birth date of the user.

While these security measures are typically highly effective, there are instances in which fraudsters are able to overcome them. For example, some fraudsters are able to obtain the personal data needed to satisfy security protocols. In some cases, fraudsters even hijack email accounts and are able to access account recovery links sent to the users.

Because no single security protocol is fully effective by itself, some data management systems, such electronic tax return preparation systems, use a combination of these security measures to ensure the security of their users' accounts. However, fraudsters continually work to discover new and often creative ways to defeat existing security measures. In response, the data management systems also continually attempt to develop new security measures to stay ahead of fraudsters. The result is an on-going arms race-like escalation of measures and counter measures that represents a significant allocation or human and non-human resources.

While in the discussion above electronic tax return preparation systems were used a specific illustrative example, the fraud related issues discussed above are not limited to electronic tax return preparation systems. Fraudsters historically attempt to attack any systems that manage sensitive user data.

What is needed is a technical solution to the long-standing technical problem of providing more effective security measures for user authentication used by data management systems.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented in a system. An example system may include one or more processors, and at least one memory coupled to the one or more processors and storing instructions that, when executed by the one or more processors, cause the system to perform operations. Example operations may include generating, using an error correction code process, an encoded identification tag including identification information associated with a system user's account, embedding the encoded identification tag in a transaction description associated with a payment from the system user, receiving a request to access the system user's account, retrieving an existing identification tag from the transaction description responsive to the request, generating, using the error correction code process, a decoded identification tag from the existing identification tag, determining whether information retrieved from the decoded identification tag matches the identification information included in the encoded identification tag, and granting the request to access the system user's account if at least a portion of the information retrieved from the decoded identification tag matches the identification information or denying the request to access the system user's account if the information retrieved from the decoded identification tag does not match at least a portion of the identification information.

In some implementations, the request to access the system user's account is received from the system user, and execution of the instructions may further cause the system to perform operations including submitting an account access request to an institution associated with the payment responsive to receiving the request from the system user, receiving, from the institution associated with the payment, an approval to access the system user's account, accessing the system user's account responsive to receiving the approval, and locating the transaction description within the system user's account, where retrieving the existing identification tag is responsive to the locating. In some aspects, execution of the instructions may further cause the system to perform operations including comparing information retrieved from the decoded identification tag to the identification information included in the encoded identification tag, where the determining is responsive to the comparing.

In some other implementations, at least one portion of the information retrieved from the decoded identification tag is corrupt, altered, or missing, and execution of the instructions may further cause the system to perform operations including matching a remaining portion of the information retrieved from the decoded identification tag to at least a portion of the identification information based on the error correction code process. In some aspects, the embedding occurs prior to the payment being processed, and execution of the instructions may further cause the system to perform operations including receiving the payment from the system user, where the payment is processed responsive to the embedding.

In some aspects, execution of the instructions may further cause the system to perform operations including requesting that the system user provide the existing identification tag from the transaction description, where retrieving the existing identification tag includes receiving the existing identification tag from the system user. In some instances, the encoded identification tag includes one or more alphanumeric characters unrelated to the payment, one or more alphanumeric characters uniquely identifying the system user, or both.

In some other instances, retrieving the existing identification tag is part of an account recovery authentication process associated with the system user. In some implementations, generating the encoded identification tag includes inserting the identification information into more than one section of the encoded identification tag.

Another innovative aspect of the subject matter described in this disclosure can be implemented as a method for authenticating a system user. The method may be performed by one or more processors of a verification system. An example method may include generating, using an error correction code process, an encoded identification tag including identification information associated with a system user's account, embedding the encoded identification tag in a transaction description associated with a payment from the system user, receiving a request to access the system user's account, retrieving an existing identification tag from the transaction description responsive to the request, generating, using the error correction code process, a decoded identification tag from the existing identification tag, determining whether information retrieved from the decoded identification tag matches the identification information included in the encoded identification tag, and granting the request to access the system user's account if at least a portion of the information retrieved from the decoded identification tag matches the identification information or denying the request to access the system user's account if the information retrieved from the decoded identification tag does not match at least a portion of the identification information.

In some implementations, the request to access the system user's account is received from the system user, and the method may further include submitting an account access request to an institution associated with the payment responsive to receiving the request from the system user, receiving, from the institution associated with the payment, an approval to access the system user's account, accessing the system user's account responsive to receiving the approval, and locating the transaction description within the system user's account, where retrieving the existing identification tag is responsive to the locating. In some aspects, the method may further include comparing information retrieved from the decoded identification tag to the identification information included in the encoded identification tag, where the determining is responsive to the comparing.

In some other implementations, at least one portion of the information retrieved from the decoded identification tag is corrupt, altered, or missing, and the method may further include matching a remaining portion of the information retrieved from the decoded identification tag to at least a portion of the identification information based on the error correction code process. In some aspects, the embedding occurs prior to the payment being processed, and the method may further include receiving the payment from the system user, where the payment is processed responsive to the embedding.

In some aspects, the method may further include requesting that the system user provide the existing identification tag from the transaction description, where retrieving the existing identification tag includes receiving the existing identification tag from the system user. In some instances, the encoded identification tag includes one or more alphanumeric characters unrelated to the payment, one or more alphanumeric characters uniquely identifying the system user, or both.

In some other instances, retrieving the existing identification tag is part of an account recovery authentication process associated with the system user. In some implementations, generating the encoded identification tag includes inserting the identification information into more than one section of the encoded identification tag.

Another innovative aspect of the subject matter described in this disclosure can be implemented as a non-transitory computer-readable medium storing instructions that, when executed by one or more processors of a system, cause the system to perform operations. Example operations may include generating, using an error correction code process, an encoded identification tag including identification information associated with a system user's account, embedding the encoded identification tag in a transaction description associated with a payment from the system user, receiving a request to access the system user's account, retrieving an existing identification tag from the transaction description responsive to the request, generating, using the error correction code process, a decoded identification tag from the existing identification tag, determining whether information retrieved from the decoded identification tag matches the identification information included in the encoded identification tag, and granting the request to access the system user's account if at least a portion of the information retrieved from the decoded identification tag matches the identification information or denying the request to access the system user's account if the information retrieved from the decoded identification tag does not match at least a portion of the identification information.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Figure 1:
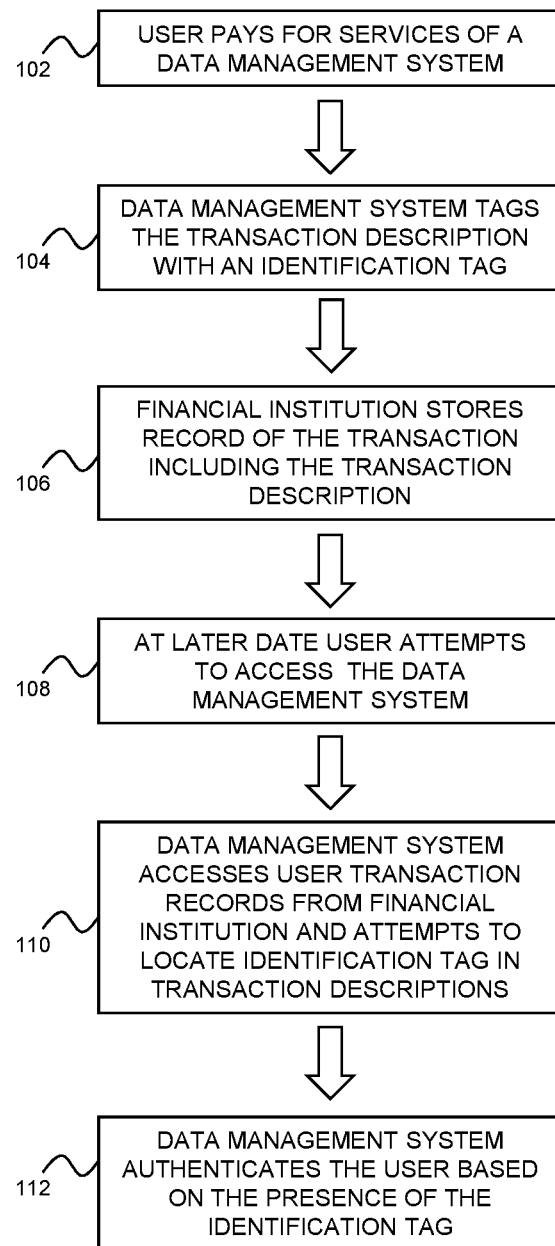
FIG. 1 is a flow diagram of a process for authenticating a user of a data management system, in accordance with one embodiment.

FIG. 1 illustrates a block diagram of a process 100 for authenticating users of a data management system, in accordance with one embodiment. When a user pays for a product or service of a data management system, a record of the payment is recorded by the financial institution. This occurs in any financial transaction in which one of the parties uses an electronic payment account such as a bank account or credit card. According to the disclosed embodiments, the data management system utilizes these transaction records to authenticate users.

The record of the financial transaction between the user and the data management system includes a description string. The description string is generated, in part, by the data management system. According to the disclosed embodiments, the data management system embeds an identification tag in the transaction description. At a later time, if the user tries to access the data management system, the data management system can use the identification tag to authenticate the user. To this end, the user can allow the data management system to access the financial account of the user. The data management system can then scan the financial transactions in that financial account in order to determine if the correct identification tag is present. If the correct identification tag is present in the financial transaction records of the user, this is a strong indication that this is the true user and not a fraudster.

In the following description, references are made to an example in which the data management system is a tax return preparation system. However, the data management system can include any other type of system that manages data of users.

Returning to FIG. 1, at 102, the user pays for the services of a data management system. If the user makes the payment to the data management system via a bank account transfer, a credit card, a debit card, or another form of electronic payment, then a record of the financial transaction is kept. The record of the financial transaction is kept by the financial institution associated with the bank account, credit card, debit card, or other electronic payment method of the user. The record of the financial transaction includes a description string. The description string is generated, in part, by the data management system that receives the payment.

At 104, the data management system tags the transaction description with an identification tag. Typically, a transaction description includes a name or partial name of the merchant involved as well as a few details related to the transaction. These details can include the price, date, time, and the nature of the service or product that was purchased. Advantageously, the data management system tags the transaction description with an identification tag. The identification tag identifies the user.

At 106, the financial institution stores a record of the transaction. The record of the transaction includes the transaction description. The transaction description includes the identification tag. Typically each user transaction is stored by the financial institution in a listing of user transactions. The user can then access his or her account with the financial institution in order to view records of the financial transactions of the user. The identification tag can be a string of numerals or alphanumeric characters not related to a typical description of a financial transaction.

In many cases, users enable the data management system to access their accounts with financial institutions so that the data management system can automatically categorize financial transactions of the users for data management purposes. Thus, the data management system can often access and view the records of the past transactions of the users, including the transaction descriptions, in order to categorize and import financial transaction data for data management process. The data management system leverages this functionality to provide enhanced authentication of the user via the identification tag.

At 108, at a later date the user attempts to access the account with the data management system. In an example in which the data management system is a tax return preparation system, users often forget their tax return preparation system login credentials because users typically only access their tax return preparation system accounts for a brief period of time once per year to file their taxes. In this case, the tax return preparation system will need to authenticate the user before providing access to the tax return preparation system account of the user. Typical account recovery authentication processes include providing answers to security questions, providing a government ID number such as a Social Security number, providing a birthdate, or providing previous mailing addresses. However, in some cases these types of information may be learned or obtained by fraudsters.

Therefore, using the disclosed embodiments, the tax return preparation system supplements these types of authentication measures by using the identification tag as an additional authentication measure. In particular, the tax return preparation system can request that the user provide account access credentials to access the financial account from which the user made payment to the tax return preparation system in a previous tax year. If the user is not a fraudster, then the user can provide the financial account access credentials to the data management system. In some cases, as will be described in more detail below, the data management system may already have access to the financial account of the user. However, even in this case, the tax return preparation system will request access credentials from the user so the user can prove that the user has access to the financial account.

At 110, the data management system accesses the user financial transaction records from the financial institution associated with the financial account of the user. The data management system can utilize the access credentials provided by the user to access the financial account. The data management system seeks to locate the identification tag in the transaction descriptions.

At 112, the data management system authenticates the user based on the presence of the identification tag in the transaction description associated with the previous payment. If the identification tag is present in the transaction records, then this is strong evidence that the individual trying to recover the data management system account is the authentic user. If the identification tag is not present in the transaction records, then this can be a possible indication of attempted fraud. Additional security measures can be taken to authenticate the user or account recovery can be denied.

In another example, the data management system may request that the user locate and provide the identification tag from the transaction descriptions in the financial account of the user. In these cases, the data management system does not access the financial account of the user and retrieve the identification tag. If the user is able to provide the correct identification tag, then the data management system can use this information to authenticate the user.

Figure 2:
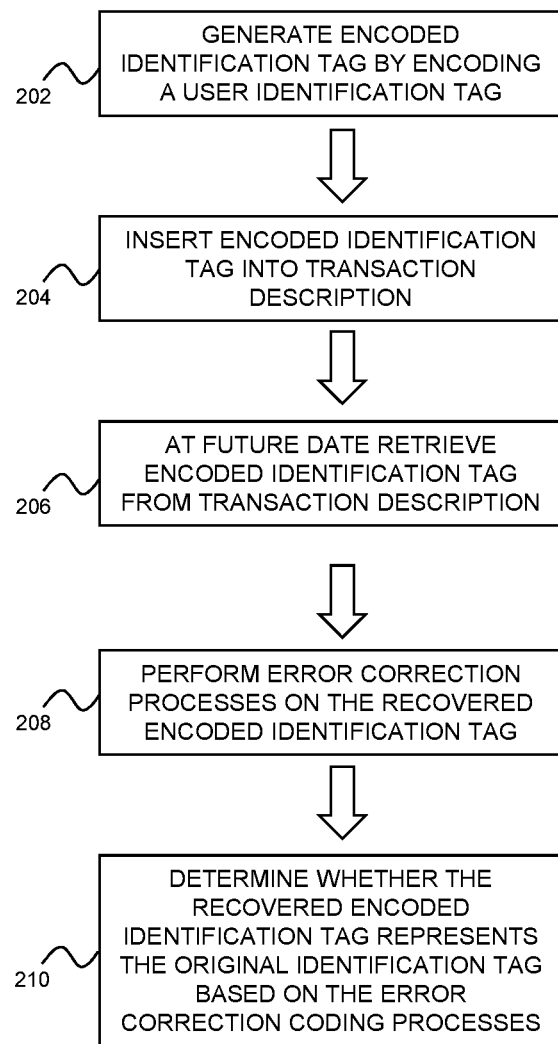
FIG. 2 is a flow diagram of a process for embedding and retrieving an identification tag in a transaction description for a payment made by the user to a data management system, in accordance with one embodiment.

FIG. 2 is a flowchart illustrating a process for generating and retrieving an identification tag, in accordance with one embodiment.

Financial transaction descriptions typically include strings of alphanumeric characters. The description string is provided, in part, by the merchant receiving payment, e.g., in this case, the data management system. Payment networks that process electronic payments between parties can include disparate systems, servers, and relays through which the description string passes before it is stored in the financial account of the user. Because of this, the description string may become somewhat corrupted by the time it is stored in the financial account of the user. Words and portions of words in the transaction description may be broken up and truncated. Some characters may be lost, and other extraneous characters may be added as the payment is processed and relayed. The result is that an identification tag embedded in a transaction description string may not be perfectly preserved when it is stored in the financial account of the user.

The process 200 helps to overcome these possible losses or alterations in an identification tag due to the processing of the payment. At 202 an encoded identification tag is generated by encoding a user identification tag. The user identification tag can be a user number or another type of identification that identifies the user. The encoded identification tag is in a form that enables recovery of the original identification tag even if some portions of the encoded identification tag are changed or lost.

The encoded identification tag can be encoded with an error correction code process. In an error correction code process, encoding is performed so that the resulting encoded information is redundant. The redundancies ensure that the original identification tag can be retrieved even if parts of the encoded identification tag are missing or corrupted. The original information tag can be recovered from any substring of sufficient length from the encoded information tag.

In one example, the user identification tag is a user number that is 10 digits in length. Because the encoding process utilizes error correction coding to encode the identification tag, the encoded identification tag will be much longer and may include a larger variety of characters. For example, the encoded identification tag can have a length of 20 or more characters and each value can include all alphanumeric characters instead of only numbers. In this case, any substring of 5 of 6 characters from the original encoded identification tag may be sufficient to recover the original user identification tag based on error correction coding processes.

At 204, the encoded identification tag is inserted into the transaction description. When the user makes an electronic payment to the data management system the data management system generates a transaction description that includes the encoded identification tag. The various portions of the payment processing network relay the description string to the financial institution of the user.

At 206, at a future date the data management system retrieves the encoded identification tag from the transaction description 206. In one example, the data management system retrieves the encoded identification tag as part of an account recovery authentication process. The data management system requests the user to grant access to the financial account of the user from which payment was made. If the user enables the data management system to gain access to the financial account, then the data management system accesses the financial account of the user and seeks the transaction description associated with the previous payment.

If the data management system is able to obtain the correct financial transaction description, then the data management system extracts transaction description including the encoded identification tag. As described previously, it is possible that the encoded identification tag will have been altered during processing of the payment. Thus, the data management system may not recover the identical encoded identification tag. Instead, the data management system may recover a corrupted or otherwise altered version of the encoded identification tag.

At 208, the data management system performs an error correction process on the encoded identification tag retrieved from the transaction description. As set forth above, the recovered encoded identification tag may be partially corrupted. The error correction process retrieves the original identification tag from the corrupted encoded identification tag based on error correction code principles. The error correction process is able to retrieve the original identification tag because the encoded identification tag is encoded with an error correction code process.

Error correction code methods are known in the art as a way to encode data for transmission in noisy channels. The error correction code methods ensure that data can be recovered even if the error correction code is somewhat corrupted or not fully received from a noisy transmission channel. Embodiments of the present disclosure advantageously leverage known error correction code methods in a unique way to improve the security of data management systems.

At 210, the data management system determines whether the recovered encoded identification tag represents the original identification tag based on the error correction coding process. If the original identification tag can be retrieved with the error correction process, then the data management system can use this as an indication that the user is not a fraudster. If the original identification tag cannot be retrieved with the error correction process, then the data management system can determine that further authentication processes are necessary or that the user should not be allowed to recover the account.

Figure 3:
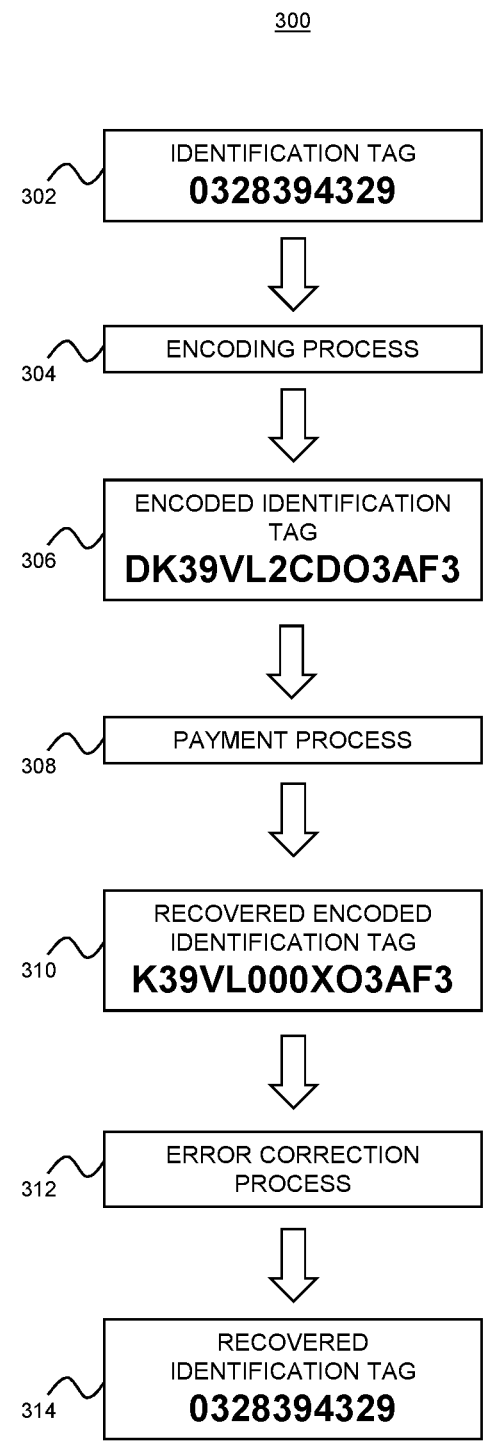
FIG. 3 is a flow diagram of a process for embedding and retrieving an identification tag in a transaction description for a payment made by the user to a data management system, in accordance with one embodiment.

FIG. 3 is a block diagram of a specific illustrative example of a system 300 for generating and recovering identification tags for data management system. FIG. 3 illustrates specific examples of an identification tag, an encoded identification tag, and a corrupted encoded identification tag.

The system 300 first generates an identification tag 302 for a user of a data management system. The system 300 can generate the identification tag 302 as part of an authentication process in which the user seeks to recover the user's account with the data management system. In the non-limiting example of FIG. 3, the identification tag 302 includes the 10-digit number 0328394329.

The system 300 passes the identification tag 302 to an encoding process 304. The encoding process 304 generates an encoded identification tag 306 by encoding the identification tag 302 with an error correcting code generation process, as discussed above.

The encoded identification tag 306 includes a larger number of digits than the identification tag 302. The encoded identification tag also includes alphanumeric characters, whereas the identification tag 302 included only numerals.

The system 300 includes the encoded identification tag 306 in a transaction description. The transaction description is a description for a payment that the user has made to the data management system.

The system 300 includes the payment process 308. The encoded identification tag 306 is passed through the payment process 308 as part of the transaction description. The payment process 308 processes the payment between the data management system and a financial institution with which the user has a payment account. The payment process includes routing the payment and the transaction description through various servers, systems, and relays. Eventually a record of the transaction is stored in the financial account of the user. The record of the transaction includes the transaction description string.

The transaction description string stored in the account of the user includes the recovered encoded identification tag 310. The recovered encoded identification tag 310 corresponds to the encoded identification tag 306. However, in this example the recovered encoded identification tag 310 has been corrupted or otherwise altered during the payment process 308.

The system 300 includes the error correction process 312. The user either enables the data management system to retrieve the recovered encoded identification tag from the financial account of the user, or the user provides the recovered encoded identification tag from the financial account of the user to the data management system. The error correction process 312 attempts to retrieve the identification tag 302 from the recovered encoded identification tag 310 using error correction processes.

The error correction process 312 generates the recovered identification tag 314 from the recovered encoded identification tag 310. The recovered identification tag 314 matches the identification tag 302.

The error correction process 312 is able to recover the recovered identification tag 314 from the recovered encoded identification tag 310 even though the recovered encoded identification tag 310 does not match the encoded identification tag. In particular, the recovered encoded identification tag 310 is missing some characters from the encoded identification tag 306. The recovered encoded identification tag 310 also includes other characters extraneous to the encoded identification tag 306. Nevertheless, the error correction process 312 is able to recover the identification tag because error correction codes offer a robust way to retrieve original information from encoded information even if portions of the encoded information are corrupted.

Figure 4:
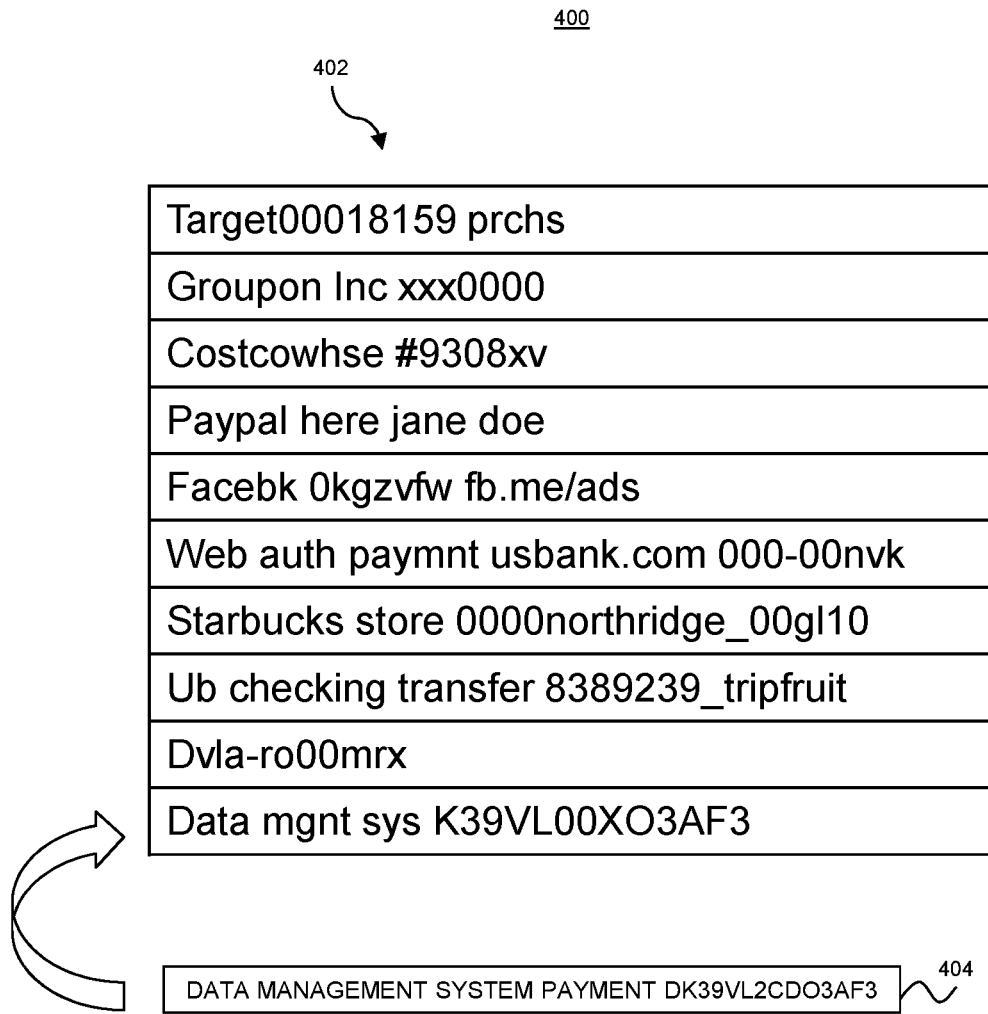
FIG. 4 is a representation of financial transaction description data stored in a financial account of a user, in accordance with one embodiment.

FIG. 4 is a representation 400 of a list of financial transaction descriptions 402 as stored in a financial account of a user within a financial institution database. The financial account of the user can correspond to an account from which the user has made a payment to a data management system. For example, if the user makes a payment from a credit card, then the financial account corresponds to the user's credit card account. If the user has made a payment from a bank account, the financial account corresponds to the user's bank account. When the user logs into the financial account, the user can view the financial transaction descriptions 402. For simplicity and clarity, FIG. 4 does not illustrate pricing and date data which are also typically included in financial transaction descriptions.

The financial transaction descriptions 402 include descriptions of financial transactions that the user has made with various counterparties. Many of the transaction descriptions are difficult to decipher. This is because the transaction descriptions have become corrupted during the payment process.

The final transaction description at the bottom of the list corresponds to the transaction description for a payment that the user has made to the data management system. FIG. 4 illustrates the uncorrupted transaction description 404 for the payment. The uncorrupted transaction description 404 includes the encoded identification tag DK39VL2CDO3AF3. The recovered transaction description included in the list 402 includes the corrupted encoded identification tag K39VL00XO3AF3.

Using error correction code methods, the data management system is able to recover the identification tag from this recovered encoded identification tag even though the middle section of the recovered encoded identification tag has been altered from the encoded identification tag. The error correction code process ensures that the encoded identification tag is redundant in the sense that the identification tag can be recovered from multiple sections of the encoded identification tag. Thus, the data management system is able to recover the identification tag from those portions of the recovered encoded identification tag that still match portions of the encoded identification tag.

Figure 5:
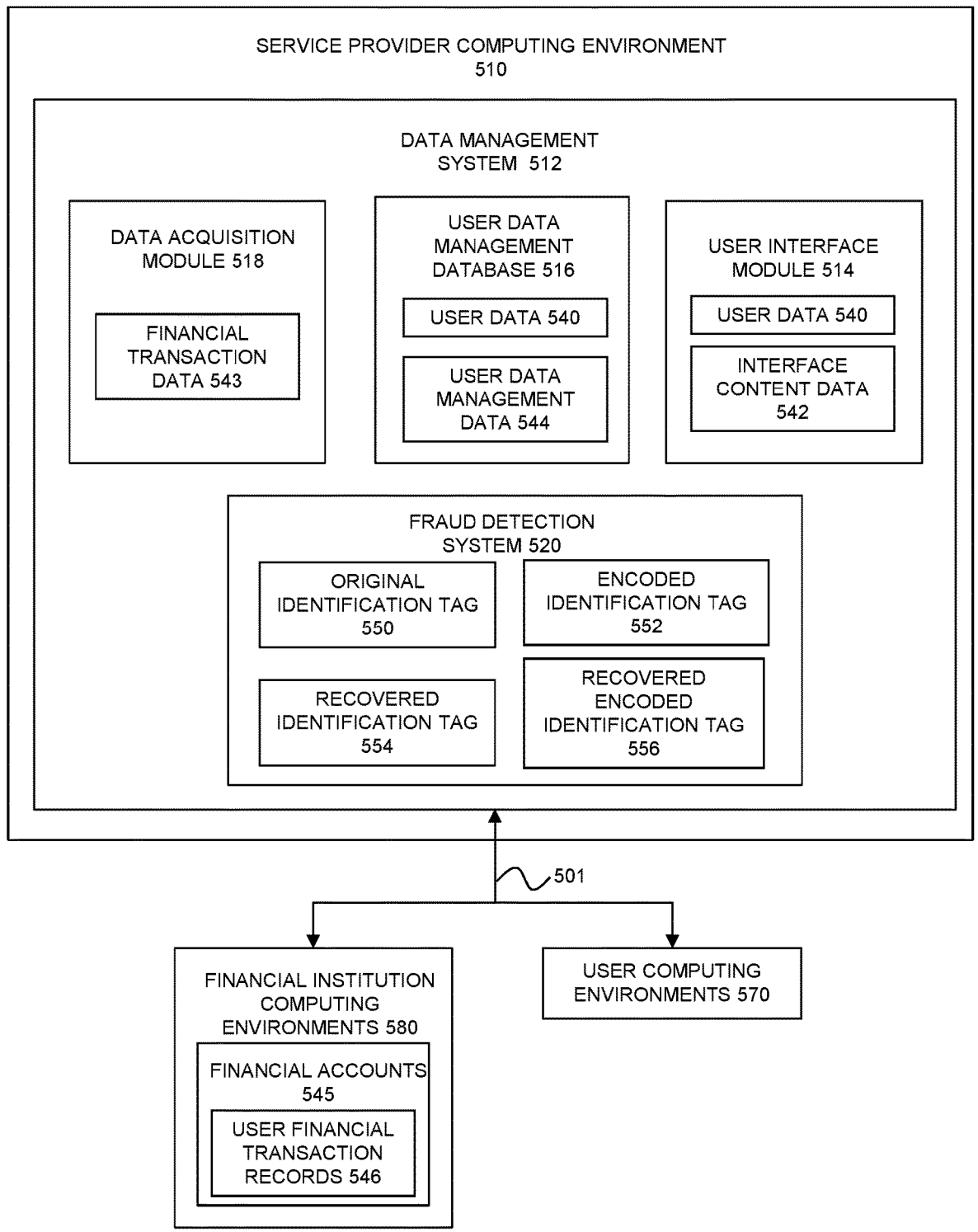
FIG. 5 is a block diagram of a production environment including a data management system, in accordance with one embodiment.

FIG. 5 illustrates a block diagram of a production environment 500 for authenticating users of the data management system, according to one embodiment.

The production environment 500 includes a service provider computing environment 510, user computing environments 570, and financial institution computing environments 580. The computing environments 510, 570, and 580 are communicatively coupled to each other with one or more communication networks 501, according to one embodiment.

The service provider computing environment 510 includes a data management system 512 configured to provide data management services to users. The data management system 512 can be a tax return preparation system or other type of data management system. The data management system 512 can be a standalone system that provides data management services to users. Alternatively, the data management system 512 can be integrated into other software or service products provided by a service provider. The data management system 512 can also include a system that manages one or more of book-keeping, accounting, banking, investments, loans, credit cards, real estate investments, retirement planning, bill pay, and budgeting.

The data management system 512 includes a user interface module 514, a user data management database 516, a data acquisition module 518, and a fraud detection system 520, according to various embodiments.

The user computing environments 570 correspond to computing environments of the various users of the data management system 512. The users of the data management system 512 utilize the user computing environments 570 to interact with the data management system 512. The users of the data management system 512 can use the user computing environments 570 to provide data to the data management system 512 and to receive data, including data management services, from the data management system 512.

Returning to the data management system 512, the user interface module 514 is configured to receive user data 540 from the users, according to one embodiment. The user data 540 can include, for each user, information, such as, but not limited to, a first name of the user, a surname of the user, a date of birth of the user, a data management system user identification, a government identification number such as a driver's license number or a Social Security number, a date of birth of the user, a phone number of the user, demographics data associated with the user, a type of account that the user has with the data management system, an address of the user, authentication data that enables the user to access the data management system 512, data related to bank accounts of the user, credit card accounts of the user, loan accounts of the user, investments of the user, or other types of data that a user may provide in working with the data management system 512, according to various embodiments.

The user interface module 514 provides interface content data 542 to assist the user in managing the user's data. The interface content data 542 can include navigation menus and other graphical user interface (GUI) tools that enable the user to navigate the data management system 512 in order to receive data management services. The interface content data 542 can include financial management data related to the financial transactions of the user. Thus, the user interface module 514 enables the data management system 512 to provide financial management services to the user.

The user data management database 516 includes user data management data 544. The user data management data 544 can include data management data for all of the users of the data management system 512. Thus, the user data management database 516 can include a vast amount of data related to the data management services provided to users. When the user utilizes the user interface module 514 to view interface content data 542, the interface content data 542 includes user data management data 544 related to the user, as retrieved from the user data management database 516.

The user data management data 544 can include financial management data of the users. The financial management data can include data related to the financial transactions of the users. The user data management data 544 can include, for each user, tax return preparation data, a list of financial transactions, summaries of various financial accounts, and other tools to assist the user in managing the user's finances. The user data management data 544 can include financial reports received, retrieved, or generated by the data management system 512.

The data management system 512 can provide data management services other than financial management services. Accordingly, the user data management data 544 can include data other than financial management data.

The data acquisition module 518 is configured to retrieve financial transaction data related to the financial transactions of the users of the data management system 512. Users of the data management system can provide access credentials for their various financial accounts to the data management system 512. The access credentials enable the data acquisition module 518 to log into or to otherwise access financial accounts that users have with various financial institutions. These financial accounts can include bank accounts, credit card accounts, cryptocurrency accounts, or online payment service accounts such as PayPal or Venmo. The data acquisition module 518 interfaces with the financial institution computing environments 580 to access the financial accounts 545 of the users.

The financial accounts 545 of the users typically include records of the financial transactions of the users. The data acquisition module 518 is able to retrieve the financial transaction records of the users. The data acquisition module 518 stores financial transaction data 543 for the users. The financial transaction data 543 includes financial transaction descriptions and records retrieved from the financial accounts 545 of the users.

The data management system 512 utilizes the financial transaction data 543 to provide data management services for users. In the example in which the data management system 512 is a tax return preparation system, the tax return preparation system accesses financial transaction records of the users in order to automatically retrieve and categorize financial transactions of the users for tax purposes. The tax return preparation system can greatly enhance the tax return preparation process for the users by automatically retrieving and categorizing financial transactions.

In an example in which the data management system 512 includes a personal budgeting management system, the data management system 512 utilizes the financial transaction data 543 to assist users to manage their budgets. The data management system 512 can automatically retrieve and categorize financial transactions for budgeting purposes. The user can then view current budgeting information by accessing the data management system 512.

According to the disclosed embodiments, the data management system 512 advantageously utilizes the data acquisition module 518 to assist in authenticating users. The data management system 512 utilizes the data acquisition module 518 and the fraud detection system 520 to assist in authenticating users and preventing fraud.

As described above, users of the data management system 512 sometimes forget or otherwise lose track of their login credentials associated with the data management system 512. In these cases, the users can request to recover their login credentials such as their usernames or their passwords. In this illustrative example, the data management system 512 uses the fraud detection system 520 and the data acquisition module 518 to help authenticate users so that they can recover their login credentials.

When users make a payment to the data management system 512, the fraud detection system 520 generates an original identification tag 550 to insert into the transaction description for the financial transaction. The fraud detection system 520 can also generate an encoded identification tag 552 by encoding the original identification tag 550 with an error correction code process. Thus, inserting the original identification tag 550 into the transaction description can include inserting the encoded identification tag 552 into the transaction description.

After the original identification tag 550 has been inserted into the transaction description, the payment is processed via the payment processing networks, as described previously. A record of the payment is stored in the financial account 545 of the user. In particular, the financial institution computing environments 580 include user financial transaction records 546. The record of the user's payment is stored in the user financial transaction records 546. The fraud detection system 520 stores a copy of the original identification tag 550 for the purpose of user authentication in the future.

At a subsequent date, the original identification tag 550 can be used to assist in the process of recovering the user's account. When the user requests to recover the account the data management system 512 utilizes the original identification tag 550 as part of the security protocol for determining whether the user should be allowed to recover the account.

In order to verify that the individual making the account recovery request is indeed the user to whom the account belongs, the fraud detection system 520 can request that the user provide access credentials for the financial account 545 with which the user previously made payment to the data management system 512. The user can then provide access credentials for the financial account to the data management system 512.

The data management system 512 utilizes the data acquisition module 518 to access the financial account of the user with the access credentials provided by the user. The data acquisition module 518 then searches for the record of the previous financial transaction among the user financial transaction records 546. If the data acquisition module locates the record of the previous transaction, then the data acquisition module 518 retrieves the transaction description associated with the previous transaction. The data acquisition module 518 then provides the transaction description to the fraud detection system 520.

The fraud detection system 520 analyzes the transaction description and retrieves the recovered identification tag 554 from the transaction description. If the original identification tag 550 was initially inserted into the transaction description as an encoded identification tag 552, then the fraud detection system 520 will obtain the recovered encoded identification tag 556. Accordingly, retrieving the recovered identification tag 554 can include retrieving the recovered encoded identification tag 556.

As described previously, the recovered encoded identification tag 556 may be corrupted or altered compared to the encoded identification tag 552. Accordingly, the fraud detection system 520 performs error correction processing on the recovered encoded identification tag 556. The error correction processing is able to retrieve the recovered identification tag 554. If the recovered identification tag 554 matches the original identification tag 550, then this is evidence that the individual making the account recovery request is the authorized user of the account. If the recovered identification tag 554 does not match the original identification tag 550 then the fraud detection system 520 may take additional security measures to authenticate the user. Alternatively, the fraud detection system may decide that the user cannot recover the account.

In one example, the fraud detection system 520 can ask the user to provide the encoded identification tag. In this case, the data management system 512 does not directly access the financial account of the user. Instead, the data management system 512 requests that the user access the financial account and retrieve the recovered encoded identification tag 554. The user can then access the financial account and retrieve the recovered encoded identification tag 556. The user can then pass the recovered encoded identification tag 556 to the data management system 512. The fraud detection system 520 can then perform error correction processes on the recovered encoded identification tag in order to retrieve the original identification tag 550.

The data management system 512 can use the encoded identification tag 552 to augment or supplement other security procedures. For example, the data management system 512 can request one or more of a government identification number, a birth date, a mailing address, an answer to a security question, a code provided in an authentication text message, or to follow a link provided in an authentication email as part of a security protocol for granting access to the user's account with the data management system 512. The data management system 512 can utilize the encoded identification tag 552 in addition to one or more of these other types of security procedures. Thus, the use of the encoded identification tag 552 enhances the security of authenticating users to recover or otherwise access an account.

Figure 6:
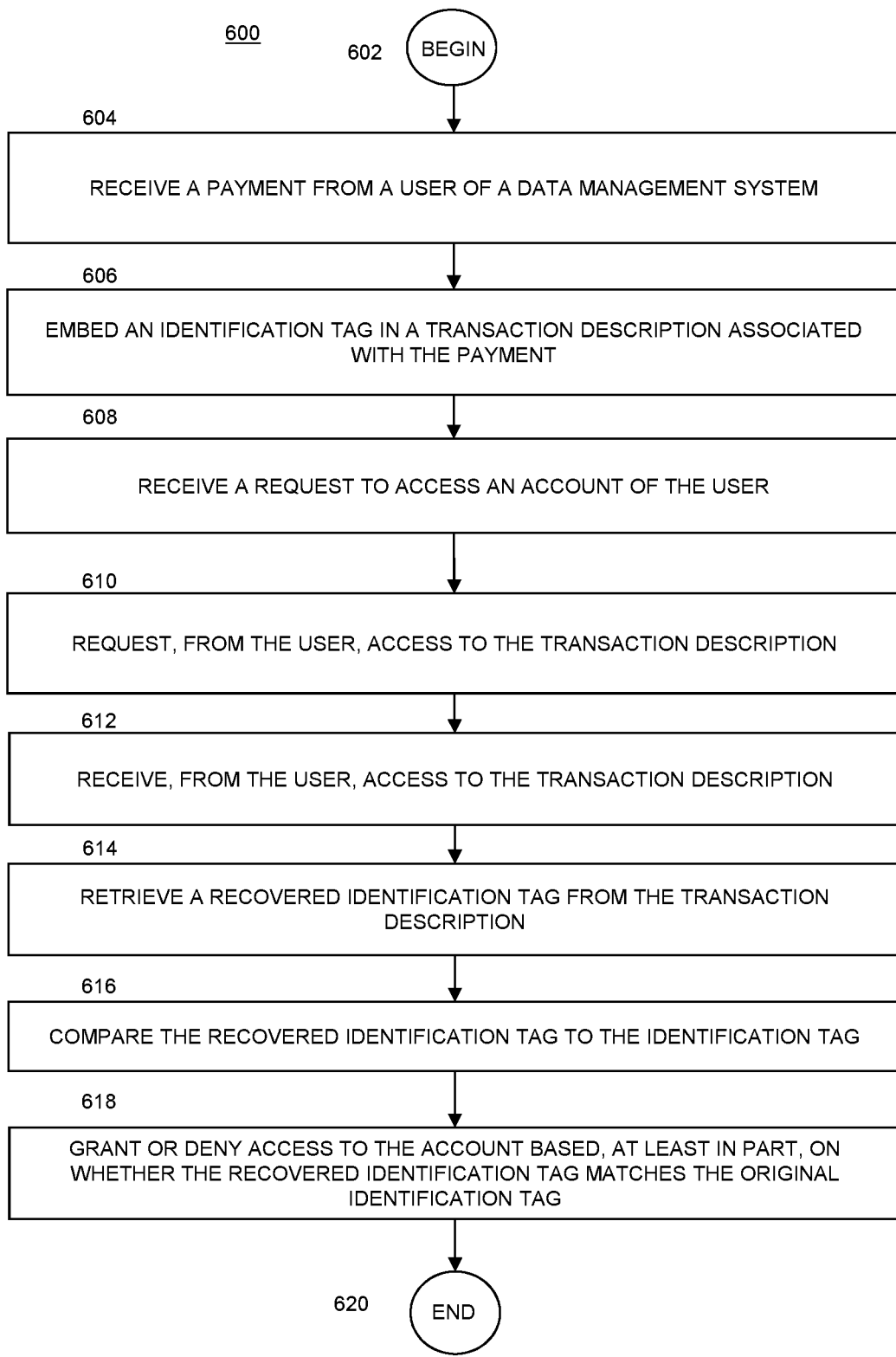
FIG. 6 is a flow diagram of a process for authenticating a user of a data management system, in accordance with one embodiment.

FIG. 6 illustrates a flow diagram of a process 600 for authenticating a user of a data management system, according to various embodiments.

Referring to FIG. 6 and the description of FIGS. 1-5 above, in one embodiment, process 600 begins at 602. From 602 process flow proceeds to 604.

At 604, a payment is received from a user of a data management system, using any of the methods, processes, and procedures discussed above with respect to FIGS. 1-5. From 604 process flow proceeds to 606.

At 606 an identification tag is embedded in a transaction description associated with the payment, using any of the methods, processes, and procedures discussed above with respect to FIGS. 1-5. From 606 the process proceeds to 608.

At 608 a request is received to access an account of the user, using any of the methods, processes, and procedures discussed above with respect to FIGS. 1-5. From 608 process flow proceeds to 610.

At 610 access to the transaction description is requested from the user, using any of the methods, processes, and procedures discussed above with respect to FIGS. 1-5. From 610 process flow proceeds to 612.

At 612 access to the transaction description is received from the user, using any of the methods, processes, and procedures discussed above with respect to FIGS. 1-5. From 612 process flow proceeds to 614.

At 614 a recovered identification tag is retrieved from the transaction description, using any of the methods, processes, and procedures discussed above with respect to FIGS. 1-5. From 614 process flow proceeds to 616.

At 616 the recovered identification tag is compared to the identification tag, using any of the methods, processes, and procedures discussed above with respect to FIGS. 1-5. From 616 process flow proceeds to 618.

At 618 access to the account is granted or denied based, at least in part, on whether the recovered identification tag matches the original identification tag, using any of the methods, processes, and procedures discussed above with respect to FIGS. 1-5. From 618 process flow proceeds to 620.

At 620 the process for authenticating a user of a data management system is exited to await new data and/or instructions.

Figure 7:
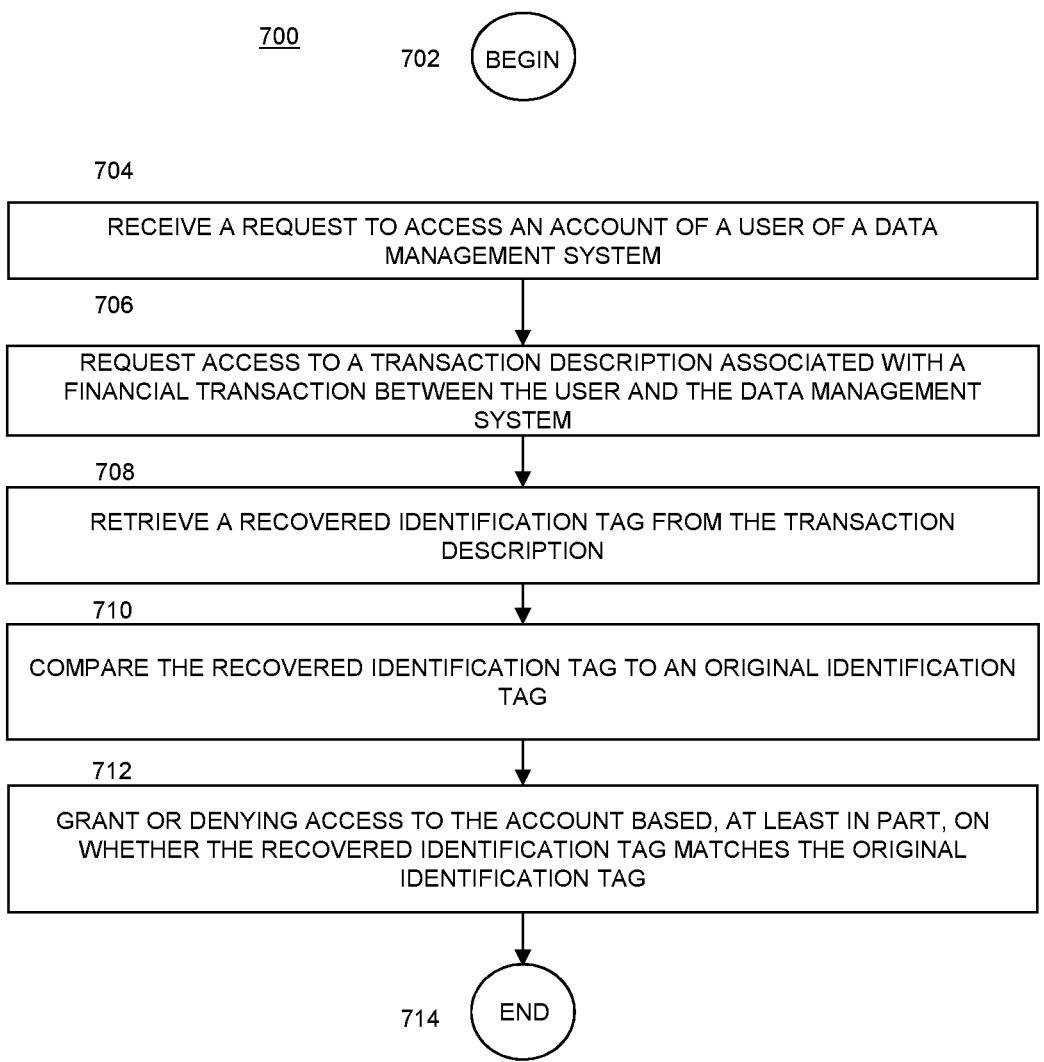
FIG. 7 is a flow diagram of a process for authenticating a user of a data management system, in accordance with one embodiment.

FIG. 7 illustrates a flow diagram of a process 700 for the process for authenticating a user of a data management system, according to various embodiments.

Referring to FIG. 7, and the description of FIGS. 1-5 above, in one embodiment, process 700 begins at 702 and process flow proceeds to 704.

At 704 a request to access an account of a user of a data management system is received, using any of the methods, processes, and procedures discussed above with respect to FIGS. 1-5. From 704 process flow proceeds to 706.

At 706 access is requested to a transaction description associated with a financial transaction between the user and the data management system, using any of the methods, processes, and procedures discussed above with respect to FIGS. 1-5. From 706 process flow proceeds to 708.

At 708 a recovered identification tag is retrieved from the transaction description, using any of the methods, processes, and procedures discussed above with respect to FIGS. 1-5. From 708 process flow proceeds 710.

At 710 the recovered identification tag is compared to an original identification tag, using any of the methods, processes, and procedures discussed above with respect to FIGS. 1-5. From 710 process flow proceeds to 712.

At 712 access is granted or denied to the account based, at least in part, on whether the recovered identification tag matches the original identification tag, using any of the methods, processes, and procedures discussed above with respect to FIGS. 1-5. From 712 process flow proceeds to 714.

At 716 the process for authenticating a user of a data management system is exited to await new data and/or instructions.

A computing system implemented method includes receiving a request to access an account of a user of a data management system and requesting access to a transaction description associated with a financial transaction between the user and the data management system. The method includes retrieving a recovered identification tag from the transaction description, comparing the recovered identification tag to an original identification tag, and granting or denying access to the account based, at least in part, on whether the recovered identification tag matches the original identification tag.

A system includes at least one processor and at least one memory coupled to the at least one processor, the at least one memory having stored therein instructions which, when executed by any set of the one or more processors, perform a process. The process includes receiving a request to access an account of a user of a data management system, requesting access to a transaction description associated with a financial transaction between the user and the data management system, and retrieving a recovered identification tag from the transaction description. The process includes comparing the recovered identification tag to an original identification tag and granting or denying access to the account based, at least in part, on whether the recovered identification tag matches the original identification tag.

Embodiments of the present disclosure address some of the shortcomings associated with traditional data management systems. A financial transaction description is used to augment the authentication security of a data management system. The various embodiments of the disclosure can be implemented to improve the technical fields of electronic data management systems, data security, user authentication, data processing, and compliance form preparation. Therefore, the various described embodiments of the disclosure and their associated benefits amount to significantly more than an abstract idea.

Using financial transaction descriptions to augment the authentication security of a data management system is a technical solution to a long-standing technical problem and is not an abstract idea for at least a few reasons. First, using financial transaction descriptions to augment the authentication security of a data management system is not an abstract idea because it is not merely an idea itself (e.g., can be performed mentally or using pen and paper). Second, using financial transaction descriptions to augment the authentication security of a data management system is not an abstract idea because it is not a fundamental economic practice (e.g., is not merely creating a contractual relationship, hedging, mitigating a settlement risk, etc.). Third, using financial transaction descriptions to augment the authentication security of a data management system is not an abstract idea because it is not a method of organizing human activity (e.g., managing a game of bingo). Fourth, although mathematics may be used to generate an analytics model, the disclosed and claimed methods and systems of using financial transaction descriptions to augment the authentication security of a data management system are not an abstract idea because the methods and systems are not simply a mathematical relationship/formula.

Using financial transaction descriptions to augment the authentication security of a data management system yields significant improvement to the technical fields of data security, electronic data management, and data processing, according to one embodiment. The present disclosure adds significantly to the field of electronic data management because using financial transaction descriptions to augment the authentication security of a data management system increases the improves the overall security of users' data.

As a result, embodiments of the present disclosure allow for reduced use of processor cycles, memory, and power consumption, by improving the efficiency of the data management system. Consequently, computing and communication systems implementing or providing the embodiments of the present disclosure are transformed into more operationally efficient devices and systems.

In addition to improving overall computing performance, using financial transaction descriptions to augment the authentication security of a data management system significantly improves the field of data management systems by more effectively and efficiently ensuring the security of users' data, according to one embodiment. Therefore, both human and non-human resources are utilized more efficiently.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system comprising:
one or more processors; and
at least one memory coupled to the one or more processors and storing instructions that, when executed by the one or more processors, cause the system to perform operations including:
generating, using an error correction code process, an encoded identification tag including identification information associated with a system user's account;
embedding the encoded identification tag in a transaction description associated with a payment from the system user;
receiving a request to access the system user's account;
retrieving an existing identification tag from the transaction description responsive to the request;
generating, using the error correction code process, a decoded identification tag from the existing identification tag;
determining whether information retrieved from the decoded identification tag matches the identification information included in the encoded identification tag; and
granting the request to access the system user's account if at least a portion of the information retrieved from the decoded identification tag matches the identification information or denying the request to access the system user's account if the information retrieved from the decoded identification tag does not match at least a portion of the identification information.

2. The system of claim 1, wherein the request to access the system user's account is received from the system user, and wherein execution of the instructions causes the system to perform operations further including:
submitting an account access request to an institution associated with the payment responsive to receiving the request from the system user;
receiving, from the institution associated with the payment, an approval to access the system user's account;
accessing the system user's account responsive to receiving the approval; and
locating the transaction description within the system user's account, wherein retrieving the existing identification tag is responsive to the locating.

3. The system of claim 1, wherein execution of the instructions causes the system to perform operations further including:
comparing information retrieved from the decoded identification tag to the identification information included in the encoded identification tag, wherein the determining is responsive to the comparing.

4. The system of claim 1, wherein at least one portion of the information retrieved from the decoded identification tag is corrupt, altered, or missing, and wherein execution of the instructions causes the system to perform operations further including:
matching a remaining portion of the information retrieved from the decoded identification tag to at least a portion of the identification information based on the error correction code process.

5. The system of claim 1, wherein the embedding occurs prior to the payment being processed, and wherein execution of the instructions causes the system to perform operations further including:
receiving the payment from the system user, wherein the payment is processed responsive to the embedding.

6. The system of claim 1, wherein execution of the instructions causes the system to perform operations further including:
requesting that the system user provide the existing identification tag from the transaction description, wherein retrieving the existing identification tag includes receiving the existing identification tag from the system user.

7. The system of claim 1, wherein the encoded identification tag includes one or more alphanumeric characters unrelated to the payment, one or more alphanumeric characters uniquely identifying the system user, or both.

8. The system of claim 1, wherein retrieving the existing identification tag is part of an account recovery authentication process associated with the system user.

9. The system of claim 1, wherein generating the encoded identification tag includes:
inserting the identification information into more than one section of the encoded identification tag.

10. A method for authenticating a system user, the method performed by one or more processors of a verification system and comprising:
generating, using an error correction code process, an encoded identification tag including identification information associated with a system user's account;
embedding the encoded identification tag in a transaction description associated with a payment from the system user;
receiving a request to access the system user's account;
retrieving an existing identification tag from the transaction description responsive to the request;
generating, using the error correction code process, a decoded identification tag from the existing identification tag;
determining whether information retrieved from the decoded identification tag matches the identification information included in the encoded identification tag; and
granting the request to access the system user's account if at least a portion of the information retrieved from the decoded identification tag matches the identification information or denying the request to access the system user's account if the information retrieved from the decoded identification tag does not match at least a portion of the identification information.

11. The method of claim 10, wherein the request to access the system user's account is received from the system user, the method further comprising:
submitting an account access request to an institution associated with the payment responsive to receiving the request from the system user;
receiving, from the institution associated with the payment, an approval to access the system user's account;
accessing the system user's account responsive to receiving the approval; and
locating the transaction description within the system user's account, wherein retrieving the existing identification tag is responsive to the locating.

12. The method of claim 10, further comprising:
comparing information retrieved from the decoded identification tag to the identification information included in the encoded identification tag, wherein the determining is responsive to the comparing.

13. The method of claim 10, wherein at least one portion of the information retrieved from the decoded identification tag is corrupt, altered, or missing, and the method further comprising:
    matching a remaining portion of the information retrieved from the decoded identification tag to at least a portion of the identification information based on the error correction code process.

14. The method of claim 10, wherein the embedding occurs prior to the payment being processed, and the method further comprising:
    receiving the payment from the system user, wherein the payment is processed responsive to the embedding.

15. The method of claim 10, further comprising:
    requesting that the system user provide the existing identification tag from the transaction description, wherein retrieving the existing identification tag includes receiving the existing identification tag from the system user.

16. The method of claim 10, wherein the encoded identification tag includes one or more alphanumeric characters unrelated to the payment, one or more alphanumeric characters uniquely identifying the system user, or both.

17. The method of claim 10, wherein retrieving the existing identification tag is part of an account recovery authentication process associated with the system user.

18. The method of claim 10, wherein generating the encoded identification tag includes:
    inserting the identification information into more than one section of the encoded identification tag.

19. A non-transitory computer-readable medium storing instructions that, when executed by one or more processors of a system, cause the system to perform operations including:
    generating, using an error correction code process, an encoded identification tag including identification information associated with a system user's account;
    embedding the encoded identification tag in a transaction description associated with a payment from the system user;
    receiving a request to access the system user's account;
    retrieving an existing identification tag from the transaction description responsive to the request;
    generating, using the error correction code process, a decoded identification tag from the existing identification tag;
    determining whether information retrieved from the decoded identification tag matches the identification information included in the encoded identification tag; and
    granting the request to access the system user's account if at least a portion of the information retrieved from the decoded identification tag matches the identification information or denying the request to access the system user's account if the information retrieved from the decoded identification tag does not match at least a portion of the identification information.

20. The computer-readable medium of claim 19, wherein the request to access the system user's account is received from the system user, and wherein execution of the instructions causes the system to perform operations further including:
    submitting an account access request to an institution associated with the payment responsive to receiving the request from the system user;
    receiving, from the institution associated with the payment, an approval to access the system user's account;
    accessing the system user's account responsive to receiving the approval; and
    locating the transaction description within the system user's account, wherein retrieving the existing identification tag is responsive to the locating.

* * * * *